United States Patent
Dodson et al.

(10) Patent No.: US 10,614,752 B1
(45) Date of Patent: Apr. 7, 2020

(54) ELECTRONIC DEVICE WITH POLARIZED AMBIENT LIGHT SENSOR

(71) Applicant: Apple Inc., Cupertino, CA (US)

(72) Inventors: Christopher M. Dodson, Santa Clara, CA (US); Aleksandr N. Polyakov, San Jose, CA (US); Guocheng Shao, Campbell, CA (US); Meng-Huan Ho, San Jose, CA (US); Niva A. Ran, Palo Alto, CA (US); Serhan O. Isikman, Sunnyvale, CA (US); Volodymyr Borshch, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/144,990

(22) Filed: Sep. 27, 2018

(51) Int. Cl.
*G09G 3/32* (2016.01)
*G02B 5/30* (2006.01)
*H05B 45/20* (2020.01)
*H05B 47/11* (2020.01)

(52) U.S. Cl.
CPC .............. *G09G 3/32* (2013.01); *G02B 5/3025* (2013.01); *H05B 45/20* (2020.01); *H05B 47/11* (2020.01); *G09G 2360/144* (2013.01)

(58) Field of Classification Search
CPC ............... G09G 3/32; G09G 2360/144; H05B 37/0218; H05B 33/0857; G02B 5/3025
See application file for complete search history.

(56) References Cited

U.S. PATENT DOCUMENTS

| | | | |
|---|---|---|---|
| 3,757,511 A | 9/1973 | Burgess et al. | |
| 7,433,031 B2 | 10/2008 | Xu et al. | |
| 2012/0182420 A1* | 7/2012 | Grokop | H04W 4/50 348/143 |
| 2013/0163005 A1* | 6/2013 | Tsang | G01J 3/513 356/519 |
| 2014/0132578 A1* | 5/2014 | Zheng | G09G 5/10 345/207 |
| 2014/0152632 A1* | 6/2014 | Shedletsky | G09G 5/10 345/207 |
| 2014/0152703 A1* | 6/2014 | Yang | G09G 5/10 345/690 |

(Continued)

FOREIGN PATENT DOCUMENTS

EP 2420408 B1 5/2013

*Primary Examiner* — Ibrahim A Khan
(74) *Attorney, Agent, or Firm* — Treyz Law Group, P.C.; G. Victor Treyz; Joseph F. Guihan (57) ABSTRACT

An electronic device may be provided with an ambient light sensor. The ambient light sensor may be a color ambient light sensor or a monochrome ambient light sensor. The electronic device may have a light-emitting component such as a display. During operation of the display, the display emits light. To reduce noise due to the emitted light while measuring ambient light, the ambient light sensor may have optical structures such as wave plates and polarizers. Theses optical structures may overlap light detectors. The optical structures may be configured to prevent ambient light from reaching a first of the light detectors while allowing ambient light to reach a second of the light detectors. The ambient light sensor may be configured to receive ambient light that has passed thorough an inactive area of a display or that has passed through a pixel array in an active area of a display.

20 Claims, 7 Drawing Sheets

(56) References Cited

U.S. PATENT DOCUMENTS

| | | | | |
|---|---|---|---|---|
| 2014/0267202 A1* | 9/2014 | Zheng | ............... | G01J 1/4204 |
| | | | | 345/207 |
| 2015/0109455 A1* | 4/2015 | Pang | ............... | G01J 1/1626 |
| | | | | 348/164 |
| 2016/0370231 A1* | 12/2016 | Agahian | ............... | G01J 3/50 |
| 2017/0092228 A1* | 3/2017 | Cote | ............... | G09G 5/30 |
| 2017/0229059 A1* | 8/2017 | Bonnier | ............... | G06F 3/044 |
| 2017/0294173 A1* | 10/2017 | Sun | ............... | G09G 5/026 |
| 2018/0204524 A1* | 7/2018 | Kucera | ............... | G09G 5/06 |
| 2018/0357462 A1* | 12/2018 | Mackey | ............... | G06K 9/00013 |

\* cited by examiner

ELECTRONIC DEVICE WITH POLARIZED AMBIENT LIGHT SENSOR

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate. Color ambient light sensors can detect changes in the color of ambient light so that compensating color cast adjustments can be made to displayed content.

It can be challenging to incorporate ambient light sensors into electronic devices. If care is not taken, an ambient light sensor may consume more space in an electronic device than desired. In some arrangements, there may be challenges associated with operating an ambient light sensor accurately due to potential interference from other components.

SUMMARY

An electronic device may be provided with a light-detecting component such as an ambient light sensor. The ambient light sensor may be a color ambient light sensor or a monochrome ambient light sensor. Control circuitry in the electronic device may use information from the ambient light sensor in adjusting the operation of the electronic device. For example, the electronic device may be provided with a display. The brightness and/or color of the display may be adjusted dynamically based on intensity and/or color measurements from the ambient light sensor.

During operation of the electronic device, the display in the electronic device may emit light. To reduce noise from the emitted light and thereby enhance the accuracy of the ambient light sensor, the ambient light sensor may have optical structures such as wave plates and polarizers. These optical structures may overlap light detectors in the ambient light sensor. In an illustrative configuration, the optical structures of the ambient light sensor are configured to prevent ambient light from reaching a first of the light detectors while allowing ambient light to reach a second of the light detectors. The control circuitry can process the output of the first and second light detectors to remove display noise contributions from ambient light measurements.

The display of the electronic device may be an organic light-emitting diode display or other display with an array of light-emitting diode display pixels or may be a liquid crystal display or other display. The ambient light sensor may be configured to receive ambient light that has passed thorough an inactive area of a display or may be configured to receive ambient light that has passed through a pixel array in an active area of a display.

DETAILED DESCRIPTION

Figure 1:
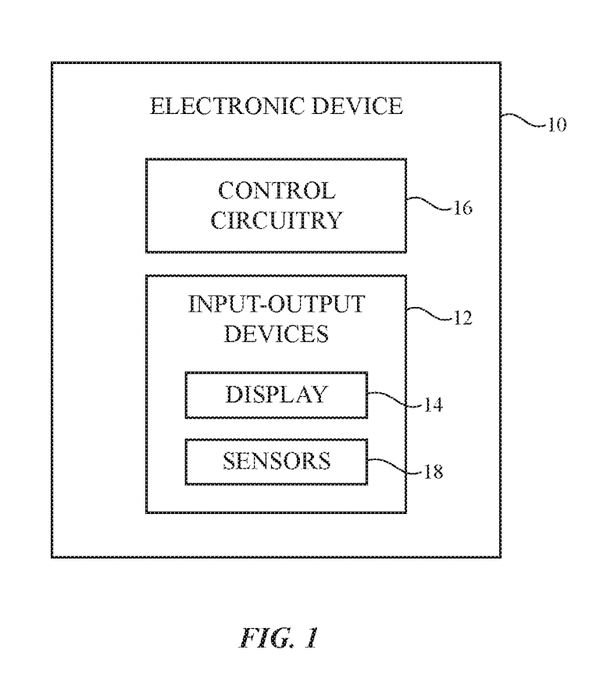
FIG. 1 is a schematic diagram of an illustrative electronic device having an ambient light sensor in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry and wireless local area network communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include a capacitive sensor, a light-based proximity sensor, a magnetic sensor, an accelerometer, a force sensor, a touch sensor, a temperature sensor, a pressure sensor, a compass, a microphone, a radio-frequency sensor, a three-dimensional image sensor, a camera, a light-based position sensor (e.g., a lidar sensor), and other sensors. Sensors 18 may also include one or more light detectors that are configured to detect ambient light. Sensors 18 may, for example, include one or more monochrome ambient light sensors and one or more color ambient light sensors that are configured to measure ambient light from the environment in which device 10 is operated. A monochrome ambient light sensor may be used to measure ambient light intensity. A color ambient light sensor may be used to measure the color (color spectrum, color temperature, color coordinates, etc.) of ambient light and may be used to measure ambient light intensity.

To make color measurements, a color ambient light sensor in device 10 may have a light detector such as a photodiode that is overlapped by a tunable wavelength filter and/or may have multiple channels each of which has a light detector such as a photodiode that is overlapped by a filter that passes a different color of light (e.g., a different wavelength band) to that light detector. By processing the readings from each of the multiple channels, the relative intensity of each of the different colors of light can be determined. Using data from the different channels in a color ambient light sensor, control circuitry 16 can therefore produce ambient light color temperature measurements and other color measurements (e.g., colors represented in color coordinates, etc.). The ambient light spectrum information may be used in controlling display 14 and/or in taking other actions in device 10. As an example, the color cast of images displayed on display 14 can be adjusted based on ambient light color measurement (e.g., to make the images on display 14 yellower in warm ambient lighting conditions and to make the images on display 14 bluer in cold ambient lighting conditions). If desired, display brightness may be automatically increased by control circuitry 16 in response to detection of bright ambient light conditions and may be automatically decreased by control circuitry 16 in response to detection of dim ambient light conditions.

Electronic device 10 may include one or more ambient light sensors. Illustrative arrangements in which device 10 includes a single ambient light sensor are sometimes described herein as an example. The ambient light sensor may be located behind a window in a housing member, under an inactive portion of a display (e.g., a border portion of a display that does not contain pixels) and/or may be located elsewhere within device 10. If desired, electronic device 10 may have an ambient light sensor that is overlapped by pixel array in an active area of a display (e.g., a portion of the display that is configured to display images). The display may have transparent portions (e.g., transparent gaps between metal traces and other opaque structures) so that ambient light may pass through the pixel array to the overlapped ambient light sensor. By locating the ambient light sensor behind the active area of the display in this way, the appearance of device 10 may be enhanced and the amount of space consumed by the ambient light sensor may be reduced. Configurations in which the ambient light sensor is located under an inactive display area or is located elsewhere within device 10 may also be used.

Figure 2:
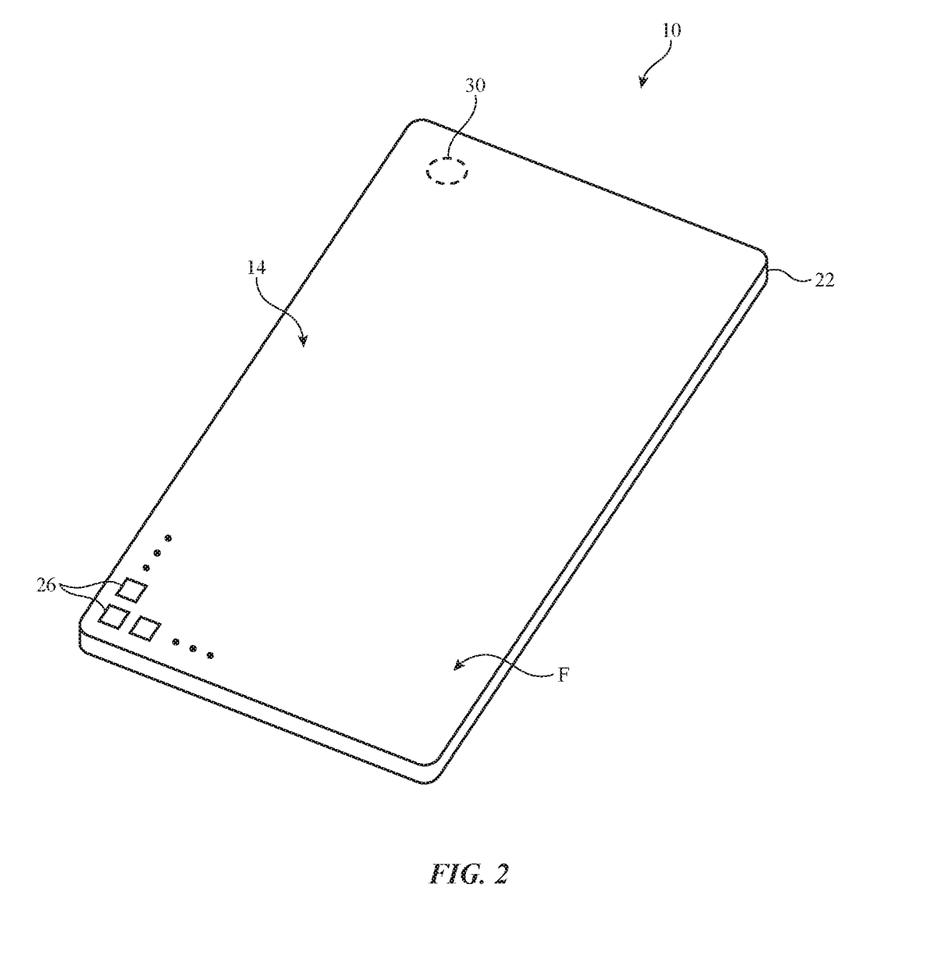
FIG. 2 is a perspective view of an electronic device with an ambient light sensor in accordance with an embodiment.

A perspective view of an illustrative electronic device of the type that may include an ambient light sensor is shown in FIG. 2. In the example of FIG. 2, device 10 includes a display such as display 14 mounted in housing 22. Display 14 may be a liquid crystal display, an electrophoretic display, an organic light-emitting diode display or other display with an array of light-emitting diodes (e.g., a display that includes pixels having diodes formed from crystalline semiconductor dies), may be a plasma display, may be an electrowetting display, may be a display based on microelectromechanical systems (MEMS) pixels, or may be any other suitable display. Display 14 may have an array of pixels 26 that extend across some or all of front face F of device 10 and/or other external device surfaces. The pixel array may be rectangular or may have other suitable shapes. Display 14 may be protected using a display cover layer such as a layer of transparent glass, clear plastic, sapphire, or other clear layer. The display cover layer overlaps an array of pixels 26.

Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.).

Pixels 26 may cover substantially all of the front face of device 10 or display 14 may have inactive areas (e.g., notches or other regions) that are free of pixels 26. The inactive areas may be used to accommodate an opening for a speaker and windows for optical components such as image sensors, an ambient light sensor, an optical proximity sensor, a three-dimensional image sensor such as a structured light three-dimensional image sensor, a camera flash, etc. Pixels 26 may, for example, extend over front surface F of device 10 and may overlap ambient light sensor 30. In this type of arrangement, ambient light may pass to ambient light sensor 30 through the array of pixels 26 in display 14.

Figure 3:
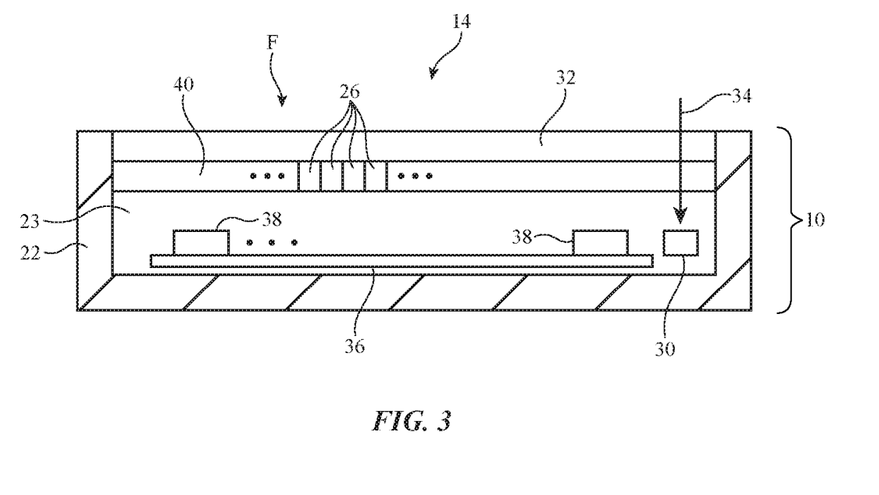
FIG. 3 is a cross-sectional side view of an illustrative ambient light sensor in an electronic device in accordance with an embodiment.

FIG. 3 is a cross-sectional side view of device 10 of FIG. 2 in an illustrative configuration in which pixels 26 overlap ambient light sensor 30. As shown in FIG. 3, housing 22 of device 10 may enclose interior region 23. Electrical components 38 (see, e.g., control circuitry 16 and input-output devices 12) may be mounted within interior region 23 (e.g., on one or more printed circuits such as printed circuit 36).

Pixel array 40 includes an array of pixels 26. Pixels 26 extend over front face F of device 10 and form in an active area for display 14 in which images are displayed. Display cover layer 32 may overlap pixel array 40. Each pixel 26 may be formed from thin-film transistors and other components (e.g., liquid crystal display pixel components such as pixel electrodes, light-emitting diode pixel components such as light-emitting diodes, etc.). Metal traces and other opaque structures in pixels 26 may block light, however, pixel array 40 may also include transparent regions between the opaque structures. The presence of transparent areas in pixel array 40 allows ambient light 34 to pass through pixel array 40 among pixels 26 to reach ambient light sensor 30.

As the example of FIG. 3 demonstrates, ambient light sensor 30 may, in some configurations, be mounted under pixel array 40. In this location within interior 23 of housing 22, the active area of display 14 that is formed by pixel array 40 overlaps ambient light sensor 30 when viewed from the exterior of device 10. By mounting ambient light sensor 30 behind pixel array 40 in this way, the overall size of device 10 can be reduced, the appearance of device 10 may be enhanced, and inactive display area may be reduced.

During operation of display 14 to display content for a user, display 14 emits light. Some of the emitted light may leak into interior region 23 and may reach ambient light sensor 30. This emitted light therefore represents a potential source of noise that has the potential to interfere with accurate measurements of ambient light 34. To ensure that accurate ambient light sensor measurements are made even in the presence of light from display 14, ambient light sensor 30 may be provided with optical structures that help discriminate between ambient light and emitted display light. The optical structures may include, for example, wave plates and polarizers. By configuring ambient light sensor 30 to discriminate between ambient light and emitted display light, control circuitry 16 can remove emitted noise contributions such as display light contributions from ambient light sensor readings before control circuitry uses these readings in making display adjustments or taking other action.

Figure 4:
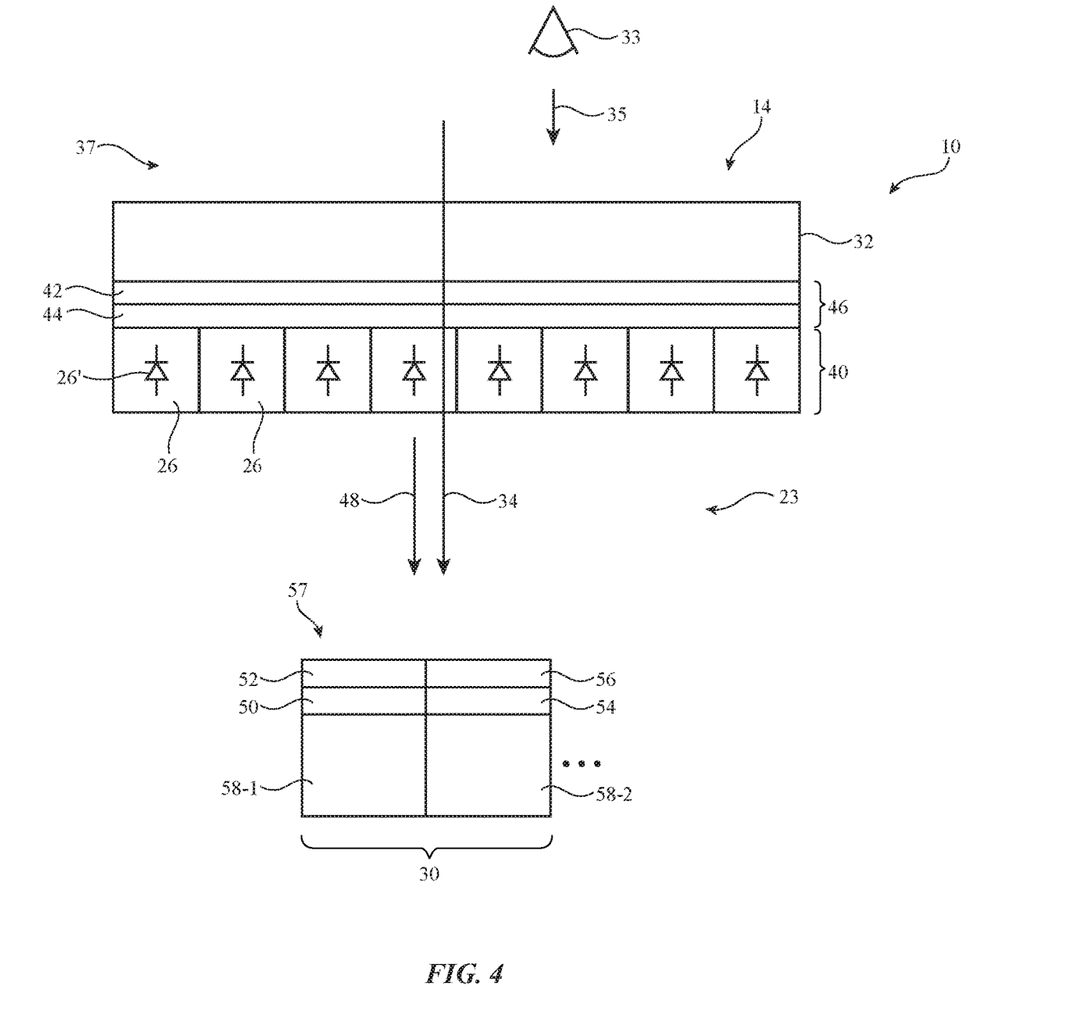
FIG. 4 is a cross-sectional side view of an illustrative light-emitting diode display and ambient light sensor in accordance with an embodiment.

FIG. 4 is a cross-sectional side view of an illustrative pixel array and ambient light sensor. In the example of FIG. 4, pixel array 40 is a light-emitting diode pixel array. Each pixel 26 in pixel array 40 includes a light-emitting diode 26' (e.g., an organic light-emitting diode or a light-emitting diode formed from a crystalline semiconductor die). To suppress reflections of ambient light 34 from pixel array 40 as display 14 is viewed by user 33 in direction 35, display 14 may be provided with circular polarizer 46. Circular polarizer 46 may include linear polarizer 42 and quarter wave plate 44.

Light that is emitted outwardly by diodes 26' may be viewed as images on display 14. Some of this emitted light may scatter from the structures of display 14 and other structures in device 10 and may leak into interior region 23, where this leaked light is detected by ambient light sensor 30 (see, e.g., emitted display light 48). To help determine which portion of the light received at ambient light sensor 30 corresponds to ambient light 34 that has passed through pixel array 40 and which portion of the light received at ambient light sensor 30 corresponds to emitted display light 48, ambient light sensor 30 may be provided with optical structures 57 and multiple light detectors (see, e.g., light detectors 58-1 and 58-2, which may be formed from individually controlled photodetectors or other light detecting devices).

There may, in general, be any suitable number of photodetectors or other light detectors in ambient light sensor 30 (e.g., two, at least four, at least six, at least 10, fewer than 50, fewer than 30, etc.). In color ambient light sensors, there may be, for example, multiple different color channels (e.g., red, blue, green, etc.) each of which detects light in a different band of wavelengths and each of these color channels may include a pair of photodetectors such as illustrative light detectors 58-1 and 58-2. In a monochrome ambient light sensor configuration, light detectors 58-1 and 58-2 may both be monochrome light detectors. An illustrative monochrome configuration for ambient light sensor 30 is described herein as an example. If desired, ambient light sensor 30 may be configured to make color ambient light sensor measurements by including pairs of detectors such as detectors 58-1 and 58-2, each pair corresponding to a different color channel.

In the illustrative monochrome ambient light sensor configuration, ambient light sensor 30 includes first detector 58-1 and second detector 58-2 and each of these light detectors is overlapped by respective optical structures. As shown in FIG. 4, for example, first detector 58-1 may be overlapped by waveplate (retarder) 52 and polarizer 50 and second detector 58-2 may be overlapped by waveplate 56 and polarizer 54. Waveplate 52 and polarizer 50 are configured to block ambient light 34. As ambient light 34 passes from exterior region 37 to interior 23 of device 10 through display 14, this ambient light passes through linear polarizer 42. Linear polarizer 42 converts the ambient light to linearly polarized ambient light. The linearly polarized ambient light then passes through quarter-wave plate 44 of circular polarizer 46 and becomes circularly polarized. There may be one or more layers (e.g., a polyimide substrate layer, etc.) in pixel array 40 that are birefringent. As the circularly polarized ambient light passes through pixel array 40, the birefringence that may be present in pixel array 40 may cause the circularly polarized ambient light to become elliptically polarized.

Waveplate 52 may be configured to convert the circularly or elliptically polarized state of the ambient light that has passed through pixel array 40 into linearly polarized light. If, for example, the ambient light passing through pixel array 40 is circularly polarized, waveplate 52 may be a quarter-wave plate. If the ambient light passing through pixel array 40 is elliptically polarized, waveplate 52 may have a different configuration (e.g., waveplate 52 may be a ⅛-wave plate, a ⅜-wave plate, etc.). A satisfactory configuration for waveplate 52 may be selected based on experimental measurements of the polarization state of light after passing through pixel array 40.

Due to the presence of waveplate 52, the ambient light that has passed through pixel array 40 and waveplate 52 will be linearly polarized. To block this light and thereby prevent ambient light 34 from being detected by detector 58-1, polarizer 50 may be a linear polarizer having a pass axis that is oriented to be perpendicular to the linear polarization orientation of the light that has passed through waveplate 52. Display light 48 will be unpolarized or will have another polarization state that is different than the linear polarization of the light that has passed through waveplate 52. As a result, detector 58-1 will detect emitted display light 48 that has leaked into interior 23 but will not detect ambient light 34.

The optical structures above detector 58-2 may be configured so that detector 58-2 detects ambient light 34. These optical structures may also be configured to help reduce the amount of emitted display light 48 that is detected by detector 58. As an example, the optical structures above detector 58-2 may include waveplate 56 and polarizer 54. Waveplate 56 may be configured to convert ambient light 34 to linearly polarized light (e.g., waveplate 56 may have the same configuration as waveplate 52). Polarizer 54 may be a linear polarizer having a pass axis that is oriented to be parallel to the linear polarization orientation of the light that has passed through waveplate 56. As a result, waveplate 56 and polarizer 54 will tend to allow all of ambient light 34 that has passed through display 14 pass to detector 58-2. At the same time, waveplate 56 and polarizer 54 may help to reduce the amount of emitted display light 48 that is sensed by detector 58-2. For example, if emitted display light 48 is unpolarized, the presence of polarizer 54 will cut the intensity of emitted display light 48 in half.

During ambient light sensor characterization operations (e.g., during design and testing), the output of detectors 58-1 and 58-2 under different conditions can be characterized. For example, display 14 may be turned off while a known amount of ambient light illuminates device 10. Detector 58-1 will not pick up any ambient light due to the waveplate and polarizer above detector 58-1. The sensitivity of detector 58-2 to ambient light can be determined by measuring the output of detector 58-2 at different ambient light levels. In a further set of characterization measurements, device 10 may be operated in a dark environment in which ambient light 34 is not present. During these measurements, display 14 may be operated to produce emitted display light 48 and the outputs of detectors 58-1 and 58-2 may be collected. In an illustrative configuration in which light 48 is not polarized, the output of detectors 58-1 and 58-2 may be equal when being exposed to light 48 and not being exposed to light 34.

In mixed lighting conditions in which both ambient light 34 and display light 48 illuminate ambient light sensor 30, the outputs of detectors 58-1 and 58-2 will have intermediate values that can be processed to determine the relative contributions of ambient light 34 and emitted display light 48. If desired, weighting factors can be applied to the outputs of each detector in ambient light sensor 30 to produce individual readings of the intensity of ambient light 34 and emitted display light 48. The equations used for mapping raw readings from detectors 58-1 and 58-2 to readings of ambient light and emitted display light may be stored in control circuitry 16 during calibration operations (e.g., ambient light sensor 30 can be calibrated based on the results of sensor characterization measurements made during initial design and testing of sensor 30 and device 10).

As this example demonstrates, control circuitry 16 can be calibrated so that the relative amounts of ambient light 34 and emitted display light 48 that are present can be determined using the outputs of detectors 58-1 and 58-2. In a color ambient light sensor, the relative contributions of ambient light and emitted display light in each color channel can be determined. After determining intensity and/or color of ambient light that is present by removing the noise associated with emitted display light 48 from the measurements made by sensor 30, control circuitry 16 can adjust display 14 or take other action.

Figure 5:
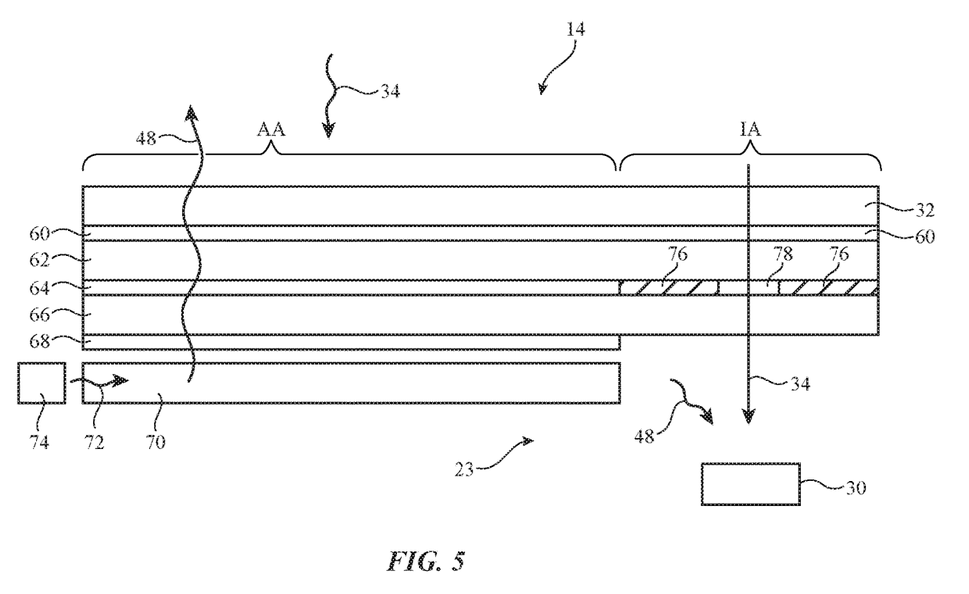
FIG. 5 is a cross-sectional side view of an illustrative liquid crystal display and ambient light sensor in accordance with an embodiment.

In general, pixel array 40 may include pixels of any suitable type (e.g., light-emitting diode pixels, liquid crystal display pixels, etc.). Ambient light sensor 30 may be overlapped by pixel array 40 as shown in FIG. 4 or may, if desired, be located in an inactive area of display 14. FIG. 5 is a cross-sectional side view of device 10 in an illustrative configuration in which display 14 has an active area AA with an array of pixels to display images and an inactive area IA that is free of pixels. In the FIG. 5 example, display 14 is a liquid crystal display having a layer of liquid crystal material (liquid crystal layer 64) sandwiched between upper layer 62 and lower layer 66. Upper layer 62 may be, for example, a color filter layer having an array of color filter elements and lower layer 66 may be a thin-film transistor layer having an array of thin-film pixel circuits for the pixels of display 14. If desired, upper layer 62 may be a thin-film transistor layer and lower layer 66 may be a color filter layer or these layers may be formed on a single substrate. Layers 62 and 66 may have glass substrates or other transparent substrates and may be sandwiched between upper linear polarizer 60 and lower linear polarizer 68.

During operation, light-emitting diodes 74 may emit light 72 into an adjacent edge of light guide layer 70. This light may be guided within light guide layer 70 in accordance with the principal of total internal reflection. Some of this light may be scattered outwardly through the pixels of active area AA and therefore serves as backlight for display 14 (e.g., light guide layer 70 and diodes 74 and optional additional structures such as reflector layers, diffuser layers, and/or other layers may serve as a backlight unit for display 14). While the backlight is being produced for display 14, some of the light in light guide layer 70 may be scattered out of light guide layer 70 and display 14 to locations in interior region 23 and can then be detected by ambient light sensor 30 as emitted display light 48 (e.g., light 48 may leak out of display 14 and may reach ambient light sensor 30).

In inactive area IA, lower display layer 66 may be transparent and liquid crystal layer 64 may be absent. Upper polarizer 60 may overlap inactive area IA. Lower polarizer 68 may be absent from inactive area IA. Opaque masking layer 76 (e.g., a black ink layer) may be formed between layers 62 and 66 to help hide internal components from view from the exterior of device 10. A window such as ambient light sensor window 78 (e.g., a transparent window formed from an opening in layer 76 and/or a transparent material in an opening in layer 76) may be formed in inactive area IA in alignment with ambient light sensor 30, so that ambient light sensor 30 receives ambient light 34. As described in connection with display 14 of FIG. 4, ambient light that passes through display 14 (e.g., through upper polarizer 60 in inactive area IA in the example of FIG. 5) may become linearly polarized. Ambient light sensor 30 of FIG. 5 may therefore have a first detector such as detector 58-1 of FIG. 4 that is covered with an orthogonal linear polarizer and may have a second detector such as detector 58-2 of FIG. 5 that is covered with a parallel polarizer. In this example, wave plates 52 and 56 may be omitted, because the ambient light that passes through upper polarizer 60 becomes linearly polarized.

In general, any configuration for optical structures 57 that allows detectors 58-1 and 58-2 to produce readings that differentiate between ambient light and emitted display light (or light from other noise sources) may be used in ambient light sensor 30. For example, waveplate 56 and/or polarizer 54 of FIG. 4 may be omitted from ambient light sensor 30 of FIG. 4, etc. In the illustrative arrangement of FIG. 6, ambient light sensor 30 has a single light detector such as detector 58 (e.g., a single photodetector or, in a color ambient light sensor arrangement a single set of photodetectors overlapped by a single corresponding set of respective color filters). Polarizer 80 may be an electrically adjustable polarizer. Optional waveplate 82 may be configured to convert incoming circularly polarized ambient light 34 of FIG. 4 to linearly polarized light as described in connection with wave plates 52 and 56 of FIG. 4 or may be omitted (e.g., in an arrangement of the type show in FIG. 5). When it is desired to make ambient light measurements, control circuitry 16 may use control input 84 to adjust the polarization state of adjustable polarizer 80 (e.g., to switch from linearly polarized to block ambient light to unpolarized or to switch between any other suitable set of distinct polarization states). The output from detector 58 in each of the different polarization states may then be processed (e.g., using weighting factors or other suitable processing techniques that remove the noise contribution from the measured data) to determine an accurate ambient light sensor reading.

Figure 7:
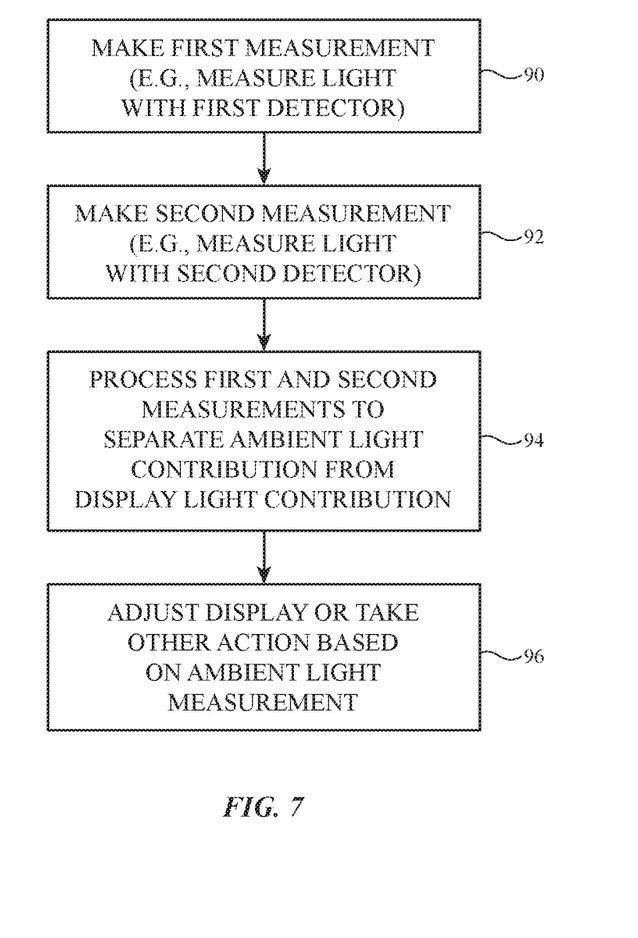
FIG. 7 is flow chart of illustrative operations involved in operating an electronic device with an ambient light sensor in accordance with an embodiment.

FIG. 7 is a flow chart of illustrative operations involved in using ambient light sensor 30 in device 10.

Figure 6:
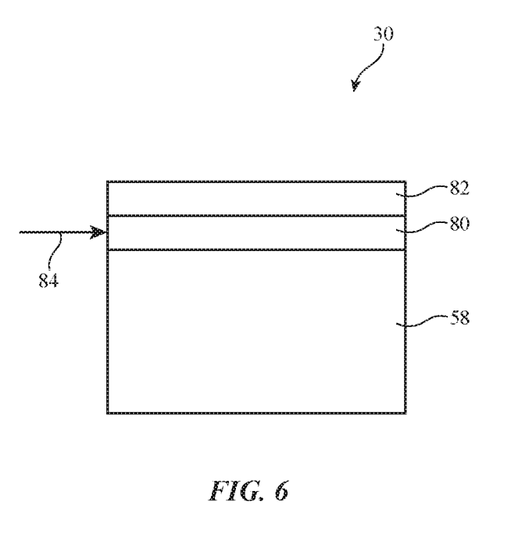
FIG. 6 is a diagram of an illustrative ambient light sensor with an adjustable polarizer layer in accordance with an embodiment.

During the operations of block 90, control circuitry 16 may make a first measurement with sensor 30 (e.g., a measurement with detector 58-1 or a measurement with detector 58 of FIG. 6 while an adjustable optical component in sensor 30 such as adjustable polarizer 80 is in a first state). During the operations of block 92, control circuitry 16 may make a second measurement with sensor 30 (e.g., a measurement with detector 58-2 or a measurement with detector 58 of FIG. 6 while the adjustable optical component in sensor 30 such as adjustable polarizer 80 is in a second state). These measurements (and additional measurements from additional detectors in configurations in which ambient light sensor 30 is a color ambient light sensor with multiple color channels of different colors) may be processed during the operations of block 94 to separate out the ambient light contribution to the measurements from the non-ambient-light contribution. The ambient light contribution, which represents an accurate measurement of ambient light 34, can then be used to take action during the operations of block 96. For example, control circuitry 16 can adjust the brightness (luminance) of display 14 based on measured ambient light sensor intensity and/or may adjust the color cast of display 14 based on measured ambient light color.

| Table of Reference Numerals | | | |
|---|---|---|---|
| 10 | Electronic Device | 12 | Input-Output Devices |
| 14 | Display | 16 | Control Circuitry |
| 18 | Sensors | 23 | Interior Region |
| 22 | Housing | 26 | Pixels |
| 30 | Light Sensor | 32 | Cover Layer |
| 33 | User | 34 | Ambient Light |
| 36 | Printed Circuit | 37 | Exterior Region |
| 38 | Electrical Components | 40 | Pixel Array |
| 42 | Linear Polarizer | 44 | Quarter Wave Plate |
| 46 | Circular Polarizer | 48 | Display Light |
| 50 | Polarizer | 52 | Wave Plate |
| 54 | Polarizer | 56 | Wave Plate |
| 57 | Optical Structures | 58-1 | Light Detector |
| 58-2 | Light Detector | 60 | Upper Polarizer |
| 62 | Upper Layer | 64 | Liquid Crystal Layer |
| 66 | Lower Layer | 68 | Lower Linear Polarizer |
| 70 | Light Guide Layer | 72 | Light |
| 74 | Light-Emitting Diodes | 76 | Layer |
| 78 | Light Sensor Window | 80 | Polarizer |
| 82 | Optional Wave Plate | 84 | Control Input |

The foregoing is merely illustrative and various modifications can be made to the described embodiments. The foregoing embodiments may be implemented individually or in any combination.

What is claimed is:

1. An electronic device configured to operate in an environment with ambient light, comprising:
    a housing;
    a display in the housing that is configured to emit display light;
    an ambient light sensor that is exposed to the emitted display light and the ambient light, wherein the ambient light sensor has first and second light detectors, wherein the display light but not the ambient light is measured by the first light detector, and wherein both the ambient light and the display light are measured by the second light detector; and
    control circuitry configured to use the ambient light sensor to measure the ambient light by processing output from the first and second light detectors to distinguish contributions due to the ambient light from contributions due to the emitted display light.

2. The electronic device defined in claim 1 wherein the display comprises a circular polarizer through which the ambient light passes before reaching the ambient light sensor.

3. The electronic device defined in claim 2 wherein the display comprises an array of organic light-emitting diode pixels through which the ambient light passes after passing through the circular polarizer and before reaching the ambient light sensor and wherein the array of organic light-emitting diode pixels is configured to emit the display light.

4. The electronic device defined in claim 3 wherein the ambient light sensor has a polarizer that overlaps the first light detector.

5. The electronic device defined in claim 4 wherein the ambient light sensor has a wave plate and wherein the polarizer is between the wave plate and the first light detector.

6. The electronic device defined in claim 4 wherein the ambient light sensor comprises a waveplate that overlaps the polarizer and wherein the wave plate and the polarizer are configured to prevent the ambient light from being measured by the first light detector.

7. The electronic device defined in claim 3 wherein the ambient light sensor comprises:
    a first wave plate and a first polarizer that overlap the first light detector to prevent the ambient light that has passed through the circular polarizer from being measured by the first light detector; and
    a second wave plate and a second polarizer that overlap the second light detector to allow the ambient light that has passed through the circular polarizer to be measured by the second light detector.

8. The electronic device defined in claim 1 wherein the display has an array of pixels and wherein the ambient light detector is configured to receive the ambient light through the array of pixels.

9. The electronic device defined in claim 8 further comprising optical structures that are configured to allow the first and second light detectors to receive different amounts of the ambient light.

10. The electronic device defined in claim 1 wherein the display has an active area with an array of pixels that is configured to display an image, wherein the display has an inactive area that is free of pixels, and wherein the abient light dectector is configured to receive the ambient light through the inactive area.

11. The electronic device defined in claim 10 wherein the inactive area contains a linear polarizer through which the ambient light passes.

12. The electronic device defined in claim 11 further comprising an ambient light sensor polarizer overlapping the first light detector, wherein the linear polarizer has a first pass axis and wherein the ambient light sensor polarizer has a second pass axis that is orthogonal to the first pass axis.

13. The electronic device defined in claim 9 wherein the control circuitry is configured to adjust the display based on the measured ambient light.

14. The electronic device defined in claim 13 wherein the control circuitry is configured to adjust a color cast of the display based on the measured ambient light.

15. An electronic device configured to operate in an environment with ambient light, comprising:
    a housing;
    a display coupled to the housing, wherein the display has an array of pixels through which the ambient light passes; and an ambient light sensor having optical structures including an ambient light sensor polarizer, wherein the ambient light sensor is configured to measure the ambient light that has passed through the array of pixels and wherein the ambient light sensor comprises a first light detector that is overlapped by the ambient light sensor polarizer and that does not receive the ambient light and comprises a second light detector that receives the ambient light.

16. The electronic device defined in claim 15 wherein the display includes a circular polarizer, wherein the ambient light has a polarization state after passing through the circular polarizer and the array of pixels and wherein the ambient light sensor comprises a wave plate that converts the polarization state of the ambient light into a linear polarization before the ambient light reaches the ambient light sensor polarizer.

17. The electronic device defined in claim 16 wherein the first light detector is overlapped by the wave plate.

18. An electronic device configured to operate in an environment with ambient light, comprising:
a housing;
a display coupled to the housing, wherein the display has an array of pixels with light-emitting diodes; and
an ambient light sensor having a first light detector and a second light detector and having a linear polarizer that overlaps the first light detector but not the second light detector, wherein the linear polarizer is configured to receive ambient light that has passed through the array of pixels.

19. The electronic device defined in claim 18 wherein the display comprises a circular polarizer through which the ambient light passes, wherein the ambient light sensor has a waveplate that is configured to convert the ambient light that has passed through the array of pixels to linearly polarized ambient light, and wherein the linear polarizer is between the wave plate and the first light detector and is configured to prevent the linearly polarized ambient light from reaching the first light detector.

20. The electronic device defined in claim 19 wherein the second light detector is configured to detect the ambient light that has passed through the array of pixels.

* * * * *